United States Patent
Schneider et al.

(10) Patent No.: US 11,700,253 B2
(45) Date of Patent: Jul. 11, 2023

(54) AUTHENTICATION, AUTHORIZATION AND ACCOUNTING FUNCTIONALITY WITHIN AN ACCESS NETWORK OF A TELECOMMUNICATIONS NETWORK AND/OR AN IMPROVED ACCESS NETWORK ARCHITECTURE

(71) Applicant: Deutsche Telekom AG, Bonn (DE)

(72) Inventors: Fabian Schneider, Darmstadt (DE); Holger Metschulat, Ginsheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 234 days.

(21) Appl. No.: 17/306,996

(22) Filed: May 4, 2021

(65) Prior Publication Data
US 2021/0352068 A1    Nov. 11, 2021

(30) Foreign Application Priority Data
May 5, 2020    (EP) .................................... 20173030

(51) Int. Cl.
*H04L 9/40*    (2022.01)
*H04L 67/133*    (2022.01)

(52) U.S. Cl.
CPC ...... *H04L 63/0892* (2013.01); *H04L 63/0876* (2013.01); *H04L 63/20* (2013.01); *H04L 67/133* (2022.05)

(58) Field of Classification Search
USPC .......................................................... 726/4
See application file for complete search history.

(56) References Cited

U.S. PATENT DOCUMENTS 8,566,926 B1 *  10/2013  Schnellbacher ........ G06F 13/00
                                                       726/4
9,923,829 B1 *   3/2018  Liu ..................... H04L 67/1029
(Continued)

FOREIGN PATENT DOCUMENTS

EP    2713583 A1    4/2014

OTHER PUBLICATIONS

C. Rigney, et al., "Remote Authentication Dial In User Service (RADIUS)", Standards Track, Jun. 1, 2000, pp. 1-77, The Internet Society, Geneva, Switzerland, XP015008648.

*Primary Examiner* — Kambiz Zand
*Assistant Examiner* — Aubrey H Wyszynski
(74) *Attorney, Agent, or Firm* — Leydig, Voit & Mayer, Ltd.

(57) ABSTRACT

A method for an access network of a telecommunications network includes: in a first step, a first authentication, authorization and accounting (AAA)-related message is sent by an authentication server entity and received by an access orchestrator entity, the first AAA-related message comprising: at least one standardized message attribute according to an access protocol; and at least one vendor-specific message attribute; in a second step, subsequent to the first step, the access orchestrator entity sends a second AAA-related message to a service edge entity, the second AAA-related message solely comprising the at least one standardized message attribute according to the access protocol; and in a third step, subsequent to the first step and prior to, during or after the second step, the access orchestrator entity sends at least one third AAA-related message to the service edge entity, the at least one third AAA-related message corresponding to a message according to an application programming interface (API) or to a further access protocol.

11 Claims, 2 Drawing Sheets

(56) References Cited

U.S. PATENT DOCUMENTS

2009/0300743 A1* 12/2009 Ma .................... H04L 9/321
  726/6
2011/0107403 A1* 5/2011 Zembutsu ............ H04W 12/06
  726/4

* cited by examiner

AUTHENTICATION, AUTHORIZATION AND ACCOUNTING FUNCTIONALITY WITHIN AN ACCESS NETWORK OF A TELECOMMUNICATIONS NETWORK AND/OR AN IMPROVED ACCESS NETWORK ARCHITECTURE

CROSS-REFERENCE TO PRIOR APPLICATIONS

Priority is claimed to European Patent Application No. EP 20 173 030.6, filed on May 5, 2020, the entire disclosure of which is hereby incorporated by reference herein.

FIELD

The present invention relates a method for an improved authentication, authorization and accounting functionality within an access network of a telecommunications network and/or an improved access network architecture, wherein the telecommunications network comprises an authentication server entity providing an authentication, authorization and accounting functionality (AAA), as well as a policy server functionality, wherein the telecommunications network furthermore comprises a plurality of service edge entities, each service edge entity providing a service enabling functionality to subscriber devices connected to the telecommunications network.

Furthermore, the present invention relates to a telecommunications network for an improved authentication, authorization and accounting functionality within an access network of a telecommunications network and/or an improved access network architecture, wherein the telecommunications network comprises an authentication server entity providing an authentication, authorization and accounting functionality (AAA), as well as a policy server functionality, wherein the telecommunications network furthermore comprises a plurality of service edge entities, each service edge entity providing a service enabling functionality to subscriber devices connected to the telecommunications network.

Additionally, the present invention relates to an access orchestrator entity for an improved authentication, authorization and accounting functionality within an access network of a telecommunications network and/or an improved access network architecture, the telecommunications network comprising the access orchestrator entity as part of the access network, and an authentication server entity providing an authentication, authorization and accounting functionality (AAA), as well as a policy server functionality, and the telecommunications network furthermore comprising a plurality of service edge entities, each service edge entity providing a service enabling functionality to subscriber devices connected to the telecommunications network.

Furthermore, the present invention relates to a program, and a computer program product for an improved authentication, authorization and accounting functionality within an access network of a telecommunications network and/or an improved access network architecture.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future, especially due to the rapid spread of various data services as well as applications in such communication networks.

Subscriber policy management and control has evolved in the past decades to include various parts in the subscriber policies such as service level agreements (SLAs), multiple services per subscriber (e.g. Voice, TV, best effort internet), per subscriber service quality-of-service configuration, per subscriber service accounting, or throttle-down traffic limits.

In fixed-line broadband access networks such subscriber policies are typically communicated between, on the one hand, the so-called service edge entity or functionality (or service edge node, i.e. the subscriber service enabling function), and, on the other hand, the policy and AAA server (providing the authentication, authorization and accounting functionality) via an access protocol, often the Radius protocol (Remote Authentication Dial-In User Service protocol). Radius is an IETF defined protocol with various standard-based (or standardized) features.

However, typically such standardized features of an access protocol, especially of the Radius protocol, are not exhaustive enough to enable the handling and control of at least some parts in the subscriber policies such as service level agreements (SLAs) and per subscriber service quality-of-service configuration, per subscriber service accounting, or throttle-down traffic limits. Hence, typically, in application of (or when using) such access protocols, especially the Radius protocol, vendor-specific attributes (VSAs) are used in addition to the standardized features of the access protocol in order to offer additional features.

These additional vendor-specific attributes typically vary among different vendors of the service edge entities or service edge nodes, such that the realization of fully disaggregated access networks, i.e. having distinct suppliers of user-plane hardware and control-plane software, is comparatively difficult.

SUMMARY

In an exemplary embodiment, the present invention provides a method for an access network of a telecommunications network. The telecommunications network comprises an authentication server entity providing an authentication, authorization and accounting (AAA) functionality and a policy server functionality. The telecommunications network further comprises a plurality of service edge entities, each service edge entity providing a service enabling functionality to subscriber devices connected to the telecommunications network. In order to enable or to provide communication services to the subscriber devices requesting such communication services, AAA-related messages are sent and received by both the authentication server entity and a service edge entity via an access orchestrator entity as part of the access network, the AAA-related messages conforming to or using an access protocol used between the authentication server entity and the service edge entity. The method comprises: in a first step, a first AAA-related message is sent by the authentication server entity and received by the access orchestrator entity, the first AAA-related message comprising: at least one standardized message attribute according to the access protocol; and at least one vendor-specific message attribute; in a second step, subsequent to the first step, the access orchestrator entity sends a second AAA-related message to the service edge entity, the second AAA-related message solely comprising the at least one standardized message attribute according to the access protocol; and in a third step, subsequent to the first step and prior to, during or after the second step, the access orchestrator entity sends at least one third AAA-related message to the service edge entity, the at least one third AAA-related message corresponding to a message according to an application programming interface (API) or to a further access protocol.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention provide a technically simple, effective and cost effective solution for an improved authentication, authorization and accounting functionality within an access network of a telecommunications network and/or an improved access network architecture, both without the need to rely on a single supplier of user-plane hardware and control-plane software, and nevertheless being able to use vendor-specific attributes in addition to the standardized features of the access protocol used. Exemplary embodiments of the present invention further provide a corresponding telecommunications network, a corresponding access orchestrator entity, and a corresponding program and computer program product.

In an exemplary embodiment, the present invention provides a method for an improved authentication, authorization and accounting functionality within an access network of a telecommunications network and/or an improved access network architecture, wherein the telecommunications network comprises an authentication server entity providing an authentication, authorization and accounting functionality (AAA), as well as a policy server functionality, wherein the telecommunications network furthermore comprises a plurality of service edge entities, each service edge entity providing a service enabling functionality to subscriber devices connected to the telecommunications network, wherein—in order to enable or to provide communication services to the subscriber devices requesting such communication services—AAA-related messages are sent and received by both the authentication server entity and the service edge entity via an access orchestrator entity as part of the access network, the AAA-related messages conforming to or using an access protocol used between the authentication server entity and the service edge entity, wherein, in order for an improved authentication, authorization and accounting functionality and/or access network architecture to be realized, the method comprises the following steps:

in a first step, a first AAA-related message is sent by the authentication server entity and received by the access orchestrator entity, the first AAA-related message comprising, besides at least one standardized message attribute according to the used access protocol, also at least one vendor-specific message attribute, in a second step, subsequent to the first step, the access orchestrator entity sends a second AAA-related message to the service edge entity, the second AAA-related message solely comprising the at least one standardized message attribute according to the used access protocol, in a third step, subsequent to the first step and prior, during or after the second step, the access orchestrator entity sends at least one third AAA-related message to the service edge entity, the at least one third AAA-related message corresponding to a message according to an application programming interface (API) or to a further access protocol.

It is thereby advantageously possible according to the present invention to overcome the aforementioned limitation of conventionally known access networks, such that both user-plane hardware components of different suppliers are able to be used while still being able to handle and control the subscriber policies in a fine-grained and dynamic manner, such that different service level agreements and per subscriber service quality-of-service configurations, per subscriber service accounting, or throttle-down traffic limits are possible to be applied.

Presently, some telecommunications operators make heavy use of non-standardized features of access protocols, including the Radius protocol, even to the point that some of such non-standard features (or vendor-specific attributes) are only used in single country deployment but not in other countries served by the same telecommunications operator. Hence, presently, there is a comparatively close lock-in effect into using specific hardware and/or software components of a specific vendor or supplier regarding, for example with respect to the access network of the telecommunications operator and in case that the business logic of the telecommunications operator is built around such non-standard features (or vendor-specific attributes). Accordingly, a transformation to disaggregated access networks (i.e. access networks made up of user-plane hardware and control-plane software of different or distinct suppliers) is rendered, conventionally, cumbersome as there is, typically, the need to, at least temporarily, provide feature-parity (prior to and after such a transformation) both for customer facing elements and for internal services of the telecommunications operator; the latter including, for example, the policy and AAA servers. Hence, in order to be able to retain alternative suppliers of control plane software, it is suggested and preferred according to the present invention that the support of only standard (or standardized) access protocol features (or standardized Radius attributes) is required. This leads to the advantageous possibility to leverage the full saving potential of new or alternative suppliers of control plane software. It is furthermore suggested that such software offers—in addition to the use of standardized access protocol features—the use of other mechanisms to configure the non-standard vendor-specific attributes. Hence, according to the present invention, a mechanism is provided to deal with subscriber policies that are provided both in standard access protocol (e.g., Radius) attributes and in non-standard access protocol vendor-specific attributes from a Policy/AAA server on endpoints that only support the standard version (or attributes or features) of the access protocol (e.g., Radius) used.

According to the present invention, the telecommunications network comprises an authentication server entity providing an authentication, authorization and accounting functionality, and typically also a policy server functionality. According to the present invention, it is advantageously possible to provide for an improved AAA functionality within an access network of the telecommunications network and/or for an improved access network architecture, for example via realizing a disaggregated access network, i.e. an access network made up of user-plane hardware and control-plane software of different or distinct suppliers. The telecommunications network comprises, besides the authentication server entity, a plurality of service edge entities, each service edge entity providing a service enabling functionality to subscriber devices connected to the telecommunications network. According to the present invention and in order to enable or to provide communication services to the subscriber devices requesting such communication services, AAA-related messages are sent and received by both the authentication server entity and the service edge entity (i.e. typically by each one of the plurality of service edge entities, respectively) via an access orchestrator entity as part of the access network. This means that such AAA-related messages are transmitted, in downlink direction (i.e. towards the user equipment or subscriber devices), from the authentication server entity via the access orchestrator entity to the (respective) service edge entity (of the considered user equipment or subscriber device), and, in uplink direction (i.e. towards the authentication server entity), from the service edge entity (of the considered user equipment or subscriber device) via the access orchestrator entity to the authentication server entity.

According to the present invention, these AAA-related messages conform to or use (or implement) an access protocol used between the authentication server entity and the service edge entity, wherein in a first step, a first AAA-related message is sent by the authentication server entity and received by the access orchestrator entity, the first AAA-related message comprising, besides at least one standardized message attribute according to the used access protocol, also at least one vendor-specific message attribute. In a second step, subsequent to the first step, the access orchestrator entity sends a second AAA-related message to the service edge entity, the second AAA-related message solely comprising the at least one standardized message attribute according to the used access protocol; and in a third step, subsequent to the first step and prior, during or after the second step, the access orchestrator entity sends at least one third AAA-related message to the service edge entity, the at least one third AAA-related message corresponding to a message according to an application programming interface (API) or to a further access protocol. It is thereby advantageously possible according to the present invention that— even though the first AAA-related message comprises vendor-specific attributes (typically besides at least one standardized message attribute according to the used access protocol)—the service edge entity can be operated conforming to the standardized version of the access protocol, and nevertheless the information content of the vendor-specific attributes within the first AAA-related message is able to be transmitted to the service edge entity.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

According to the present invention, it is advantageously possible and preferred that both the second AAA-related message and the third AAA-related message either comprise or refer to a piece of common reference information, wherein via the common reference information the second AAA-related message and the third AAA-related message are related to or are referring to each other.

It is thereby advantageously possible for the service edge entity to combine the contents of the second and third AAA-related messages, and, hence, be able to behave as if the first AAA-related message had been received by the service edge entity.

According to the present invention, it is advantageously furthermore possible and preferred that the second AAA-related message is received by an access protocol end point as part of the service edge entity, and wherein the third AAA-related message is received by a further access protocol end point as part of the service edge entity.

It is thereby advantageously possible according to the present invention to be able to use a purely standardized access protocol interface (in the form of the access protocol end point) at the service edge entity, while the service edge entity nevertheless is able to receive vendor-specific message attributes (via the further access protocol end point).

According to the present invention, it is advantageously possible and preferred that via the at least one third AAA-related message, the at least one vendor-specific message attribute, or its information content, of the first AAA-related message is transmitted to the service edge entity.

Thereby, it is advantageously possible to receive (and process or act accordingly) the complete information content of the first message of the authentication server entity.

According to the present invention, it is advantageously possible and preferred that the access protocol used between the authentication server entity and the service edge entity by the first and second AAA-related messages corresponds to one of the following protocols:
the RADIUS protocol (Remote Authentication Dial-In User Service) as defined in IETF RFC documents 2865 to 2869,
the DIAMETER authentication, authorization, and accounting protocol for computer networks.

Furthermore, it is advantageously possible and preferred according to the present invention that the at least one third AAA-related message is a message according to one or a plurality of the following application programming interfaces or protocols:
REST (Representational State Transfer),
SOAP (Simple Object Access Protocol),
WSDL (Web Services Description Language),
gRPC (Google Remote Procedure Calls),
plain HTTP (Hypertext Transfer Protocol) or HTTPS (Hypertext Transfer Protocol Secure).

Furthermore, and according to an alternative embodiment of the present invention, it is preferred that the piece of common reference information corresponds to one or a plurality of the following:
an identifier or a reference to the identifier or a hash value of the identifier of the subscriber or user of the requested communication service, especially the identifier used in the first AAA-related message, an identifier or a reference to the identifier or a hash value of the identifier of the accounting session, an identifier or a reference to the identifier or a hash value of a message identifier of the second AAA-related message and the third AAA-related message.

Thereby, it is advantageously possible to use different possibilities of common reference information such that the common reference information is able to be adapted to the respective situation.

According to a further preferred embodiment of the present invention, a first kind of AAA-related messages are exchanged between the authentication server entity and the access orchestrator entity, and a second kind of AAA-related messages are exchanged between the access orchestrator entity and the service edge entity, wherein the first kind of AAA-related messages comprise, besides one or a plurality of standardized message attributes, also one or a plurality of vendor-specific message attributes.

According to a further embodiment of the present invention,—in addition to a number of the first kind of AAA-related messages and/or in addition to a number of the second kind of AAA-related messages—via the at least one third AAA-related message and/or via a third kind of AAA-related messages exchanged between the access orchestrator entity and the service edge entity, accounting on a per service granularity is realized, wherein the access orchestrator entity establishes and maintains an internal abstraction of the subscriber policy to be applied.

Furthermore, the present invention relates to a telecommunications network for an improved authentication, authorization and accounting functionality within an access network of a telecommunications network and/or an improved access network architecture, wherein the telecommunications network comprises an authentication server entity providing an authentication, authorization and accounting functionality (AAA), as well as a policy server functionality, wherein the telecommunications network furthermore comprises a plurality of service edge entities, each service edge entity providing a service enabling functionality to subscriber devices connected to the telecommunications network, wherein—in order to enable or to provide communication services to the subscriber devices requesting such communication services—AAA-related messages are sent and received by both the authentication server entity and the service edge entity via an access orchestrator entity as part of the access network, the AAA-related messages conforming to or using an access protocol used between the authentication server entity and the service edge entity, wherein, in order for an improved authentication, authorization and accounting functionality and/or access network architecture to be realized, the telecommunications network is configured such that:

a first AAA-related message is sent by the authentication server entity and received by the access orchestrator entity, the first AAA-related message comprising, besides at least one standardized message attribute according to the used access protocol, also at least one vendor-specific message attribute, the access orchestrator entity sends a second AAA-related message to the service edge entity, the second AAA-related message solely comprising the at least one standardized message attribute according to the used access protocol, the access orchestrator entity sends at least one third AAA-related message to the service edge entity, the at least one third AAA-related message corresponding to a message according to an application programming interface (API) or to a further access protocol.

Furthermore, the present invention relates to an access orchestrator entity for an improved authentication, authorization and accounting functionality within an access network of a telecommunications network and/or an improved access network architecture, the telecommunications network comprising the access orchestrator entity as part of the access network, and an authentication server entity providing an authentication, authorization and accounting functionality (AAA), as well as a policy server functionality, and the telecommunications network furthermore comprising a plurality of service edge entities, each service edge entity providing a service enabling functionality to subscriber devices connected to the telecommunications network, wherein—in order to enable or to provide communication services to the subscriber devices requesting such communication services—AAA-related messages are sent and received by both the authentication server entity and the service edge entity via the access orchestrator entity, the AAA-related messages conforming to or using an access protocol used between the authentication server entity and the service edge entity, wherein, in order for an improved authentication, authorization and accounting functionality and/or access network architecture to be realized, the access orchestrator entity is configured such that:

a first AAA-related message is sent by the authentication server entity and received by the access orchestrator entity, the first AAA-related message comprising, besides at least one standardized message attribute according to the used access protocol, also at least one vendor-specific message attribute, the access orchestrator entity sends a second AAA-related message to the service edge entity, the second AAA-related message solely comprising the at least one standardized message attribute according to the used access protocol, the access orchestrator entity sends at least one third AAA-related message to the service edge entity, the at least one third AAA-related message corresponding to a message according to an application programming interface (API) or to a further access protocol.

Still additionally, the present invention relates to a program comprising a computer readable program code which, when executed on a computer and/or on a network node of a telecommunications network and/or on an access orchestrator entity and/or on a service edge entity, or in part on a network node of a telecommunications network and in part on an access orchestrator entity and/or in part on a service edge entity, causes the computer and/or the network node of a telecommunications network and/or the access orchestrator entity or the service edge entity to perform the inventive method.

Furthermore, the present invention relates to a computer program product for an improved authentication, authorization and accounting functionality within an access network of a telecommunications network and/or an improved access network architecture, the computer program product comprising a computer program stored on a storage medium, the computer program comprising program code which, when executed on a computer and/or on a network node of a telecommunications network and/or on an access orchestrator entity and/or on a service edge entity, or in part on a network node of a telecommunications network and in part on an access orchestrator entity and/or in part on a service edge entity, causes the computer and/or the network node of a telecommunications network and/or the access orchestrator entity or the service edge entity to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
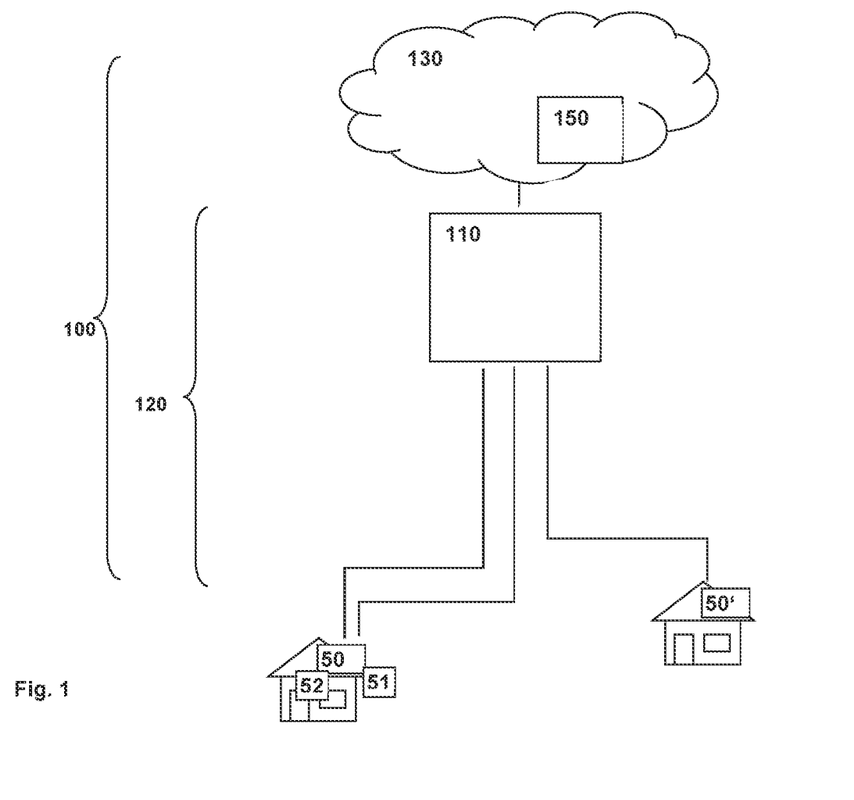
FIG. 1 schematically illustrates a telecommunications network according to the present invention, having a broadband access network and a plurality of subscriber devices or user equipment.

In FIG. 1, a telecommunications network 100 according to the present invention is schematically shown, having—preferably—at least a fixed line part. A mobile (or cellular) part may be present as well, as part of the telecommunications network 100. User equipments or client devices 51, 52 are connected via a subscriber device 50, e.g. a customer premises equipment or home gateway, to the telecommunications network 100 via a (broadband) access network 120. Additionally, a further subscriber device 50' or customer premises equipment or home gateway is also represented in FIG. 1. However, client devices 51, 52, may also be connected directly to the telecommunications network 100, and, hence, serve as subscriber devices 50. The telecommunications network 100 comprises—as part of the broadband access network 120—at least one logical or physical central office point of delivery 110 that is preferably realized within a data center and that is able to handle different access requirements, such as different access possibilities, of subscriber devices 50, 51 to network functionalities provided by the telecommunications network 100 or via the telecommunications network 100. Preferably but not necessarily, the central office point of delivery 110 may comprise a switching fabric.

The telecommunications network 100 also comprises a core network 130, and the telecommunications network 100 comprises an authentication server entity 150 or functionality as part of the core network 130. A plurality of service edge nodes are typically provided as part of the access network 120 of the telecommunications network 100, and each service edge node of the plurality of service edge nodes (one of which is schematically shown in FIG. 2) provides a service enabling functionality to typically a plurality of subscriber devices 50, 50', 51 connected to the telecommunications network 100.

Figure 2:
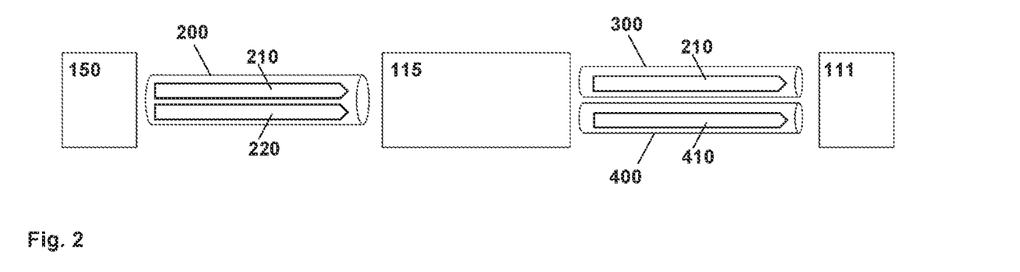
FIG. 2 schematically illustrates an example of a part of the telecommunications network, especially a part of the access network of the telecommunications network, comprising an authentication server entity, an access orchestrator entity, and a service edge entity.

In FIG. 2, an example of a part of the telecommunications network 100, especially a part of the access network 120 of the telecommunications network 100, is schematically shown, comprising the authentication server entity 150, an access orchestrator entity 115, and a service edge entity 111. The service edge entity 111 typically serves a plurality of subscriber devices 50, 50', 51, and, in case one or a plurality of these subscriber devices 50, 50', 51 request(s) access to the telecommunications network 100—or request(s) another telecommunications service—, such a request (or such requests) is (are) transmitted to the corresponding service edge entity 111 which in turn addresses a request to the authentication server entity 150, typically using an access protocol, i.e. using messages (hereinafter also designated by the term AAA-related messages) complying with an access protocol (or AAA-protocol) used between the service edge entity 111 on the one hand, and the authentication server entity 150 on the other hand. In order for the requesting subscriber device 50, 50', 51 to gain access to the telecommunications network 100, the authentication server entity 150 answers to the initial request of the service edge entity 111, likewise via one or a plurality of AAA-related messages. This principle is, of course, true for typically all the service edge entities being part of the telecommunications network 100 or being part of the access network 120; however, only one such communication (or AAA-related message transmission) is schematically shown in FIG. 2, and only the communication (i.e. the transmission of AAA-related messages) in the direction from the authentication server entity 150 towards the service edge entity 111 is shown in FIG. 2: A first kind of AAA-related messages 200 is (are) transmitted from the authentication server entity 150 to the access orchestrator entity 115, and a second kind of AAA-related messages 300 is (are) transmitted from the access orchestrator entity 115 to the service edge entity 111. The first kind of AAA-related messages 200 comprise, besides one or a plurality of standardized message attributes 210, also one or a plurality of vendor-specific message attributes 220. The second kind of AAA-related messages 300 comprise the one or the plurality of standardized message attributes 210. Via a third kind of AAA-related messages 400—in addition to both the first kind of AAA-related messages 200 and the second kind of AAA-related messages 300—exchanged between the access orchestrator entity 115 and the service edge entity 111, it is advantageously possible, according to the present invention, to transmit the at least one vendor-specific message attribute 220 (of the first kind of AAA-related messages 200), and nevertheless stick to the exchange of purely standardized AAA-related messages between the access orchestrator entity 115 and the service edge entity 111 regarding the standardized message attributes 210. It is thereby advantageously possible to transmit policy information 410 relating to the vendor-specific message attributes 220, and, hence, the possibility to provide accounting on a per service granularity.

Figure 3:
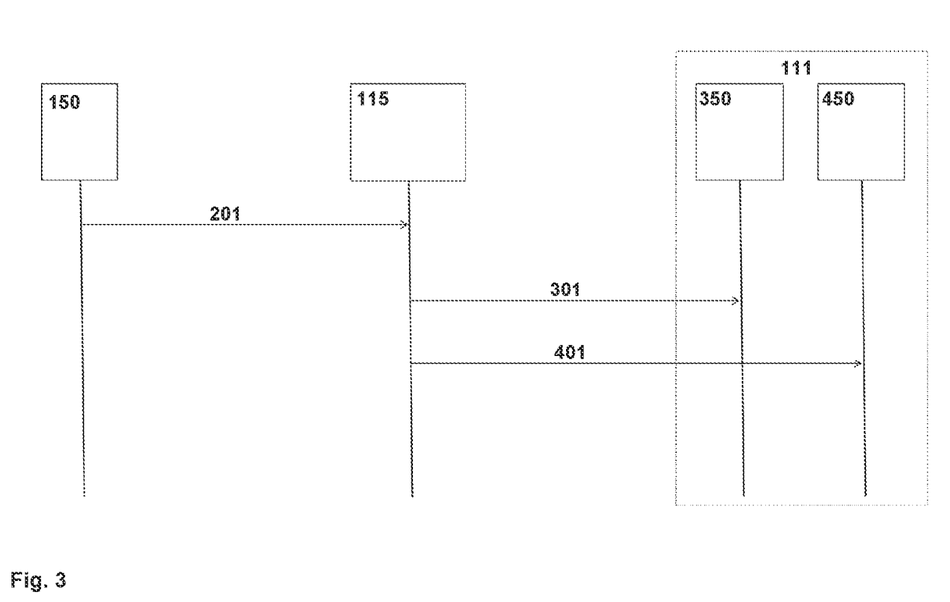
FIG. 3 schematically illustrates an example of a communication between the authentication server entity, the access orchestrator entity, and the service edge entity.

In FIG. 3, an example of a communication between the authentication server entity 150, the access orchestrator entity 115, and the service edge entity 111 is schematically shown. A first AAA-related message 201 (of the first kind of AAA-related messages 200) is sent by the authentication server entity 150, and received by the access orchestrator entity 115. The first AAA-related message 201 comprises, besides at least one standardized message attribute 210 according to the used access protocol, also at least one vendor-specific message attribute 220. In a second step, subsequent to the first step, the access orchestrator entity 115 sends a second AAA-related message 301 (of the second kind of AAA-related messages 300) to the service edge entity 111. According to the present invention, the second AAA-related message 301 solely comprises the at least one standardized message attribute 210 according to the used access protocol. In a third step, subsequent to the first step and prior, during or after the second step, the access orchestrator entity 115 sends at least one third AAA-related message 401 (of the third kind of AAA-related messages 400) to the service edge entity 111, the at least one third AAA-related message 401 corresponding to a message according to an application programming interface (API) or to a further access protocol. According to the present invention, the second AAA-related message 301 is received by an access protocol end point 350 as part of the service edge entity 111, and the third AAA-related message 401 is received by a further access protocol end point 450 as part of the service edge entity 111.

Hence, according to the present invention, a method for an improved authentication, authorization and accounting functionality within the access network 120 is provided, wherein in order to enable or to provide communication services to the subscriber devices 50, 51 requesting such communication services, AAA-related messages are sent and received by both the authentication server entity 150 and the service edge entity 111 via the access orchestrator entity 115 as part of the access network 120. According to the present invention, AAA-related messages are used that conform to or use an access protocol (e.g., the Radius access protocol) used between the authentication server entity 150 and the service edge entity 111, however, at least between the access orchestrator entity 115 and the access protocol end point 350 of the service edge entity 111, only AAA-related messages (AAA-related messages of the second kind 300) comprising (exclusively) standardized message attributes 210 are used or exchanged, despite the fact that, between the authentication server entity 150 and the access orchestrator entity 115, AAA-related messages (AAA-related messages of the first kind 200) are exchange, comprising both standardized message attributes 210, and vendor-specific message attributes 220.

According to the present invention, it is therefore advantageously possible to realize the service edge entity 111, or at least the service edge entity's 111 access protocol end point 350 such that only AAA-related messages, comprising exclusively standardized message attributes 210 are used or exchanged; this provides the possibility to realize a fully disaggregated access network, i.e. having distinct suppliers of user-plane hardware and control-plane software. Part of the transition to a disaggregated access network is often the introduction of cloud-native approaches such as placing mini data centers for running management and orchestration (higher level control) tasks close to the access network elements as part of the central office point of delivery 110. One such orchestration task is related to broker and translate subscriber policies according to the supported protocols and application program interfaces of the various endpoints. As shown in FIG. 2, the access orchestrator (or access orchestrator entity) 115 intercepts the AAA-related messages of the first kind 200 (comprising the combined (standard and vendor-specific) Radius attributes 210, 220 from the policy and AAA server (authentication server entity 150). The access orchestrator entity 115 parses these AAA-related messages (of the first kind 200) apart, and leaves (or transmits) the supported standard ones (i.e. comprising exclusively the standardized message attributes 210) in the access protocol connection (Radius protocol connection) towards the service edge entity 111. In addition, the access orchestrator entity 115 established a suitable second policy control connection to the service edge entity 111, using a supported protocol or application program interface via using AAA-related messages of the third kind 400, corresponding to messages according to an application programming interface or to a further access protocol.

The approach according to the present invention may include the translation of vendor-specific attributes 220 and/or mapping to the replacement interface of the service edge entity 111 (i.e. the further access protocol end point 450 of the service edge entity 111).

According to a preferred embodiment of the present invention, the access orchestrator entity 115 establishes and maintains an internal abstraction of the configured subscriber policy received from the policy & AAA server, i.e. the authentication server entity 150. Thereby, it is advantageously possible according to the present invention, that several different secondary configuration options (protocols or APIs) are able to be supported, e.g. when dealing with different suppliers of service edge entity 111 software.

Exemplary embodiments of the present invention combine multiple services or policy pieces on the authentication server entity (or Policy & AAA server, i.e. the access server) into a joint policy per subscriber and transmit this one policy via one access protocol connection (e.g., a Radius connection) to a service edge entity (or access device), and are able to realize a disaggregated access network, i.e. using service edge entities 111 of different suppliers of user-plane hardware and control-plane software. This is realized, according to the present invention, via requiring fewer (or none at all) supported vendor-specific attributes (i.e. supported by the service edge entities 111 or the access devices) and instead use multiple access protocols or combination of protocols and APIs in order to be able to support feature-rich user profile management and accounting on a per service granularity.

In the following, an example according to the present invention is provided using the Radius protocol as the access protocol used. Exemplarily, a Radius access accept message (as an example of an AAA-related message) is specifically used to show how standard (or standardized) message attributes and vendor-specific message attributes are used in the access accept message towards the Radius endpoint of the service edge entity 111 (or the access protocol end point 350), on the one hand, and the API endpoint of the service edge entity 111 (or the further access protocol end point 450), on the other hand.

The example encompasses a Radius Access Accept (as an AAA-related message of the first kind 200) from the Policy & AAA Server (i.e. the authentication server entity 150) that is not supported by the service edge entity 111, due to the AAA-related message of the first kind 200 (or the first AAA-related message 201) comprising, besides at least one (but typically more than one) standardized message attribute 210 also at least one vendor-specific message attribute 220. As an example of such a vendor-specific attribute, the "Enable IGMP" (enable Internet Group Management Protocol) vendor-specific attribute is exemplarily taken. According to the present invention, it is assumed that a service edge entity 111 is used that is able to receive and correctly process only standardized Radius message attributes 210, and, hence, would support the vendor-specific attribute 220 "Enable IGMP" only via an REST based API:

. . . /se/<subscriber-identifier>/<configuration-parameter>/<value>, i.e. via the further access protocol end point 450 of the service edge entity 111.

According to the present invention, it is preferred that an identifier is used in order for the service edge entity 111 to correlate the two instructions (i.e. of the second AAA-related message 301 (of the second kind of AAA-related messages 300) and of the third AAA-related message 401 (of the third kind of AAA-related messages 400)). In the context of the present invention, such an identifier information is also called a piece of common reference information (relating both the second AAA-related message 301 and the third AAA-related message 401), i.e. via the common reference information, the second AAA-related message 301 (of the second type 300) and the third AAA-related message 401 (of the third type 400) are related to or are referring to each other.

According to the present invention, the piece of common reference information may correspond to one or a plurality of the following:

an identifier or a reference to the identifier or a hash value of the identifier of the subscriber or user of the requested communication service, especially the identifier used in the first AAA-related message 201, an identifier or a reference to the identifier or a hash value of the identifier of the accounting session, an identifier or a reference to the identifier or a hash value of a message identifier of the second AAA-related message 301 and the third AAA-related message 401.

The identifier or common reference information may correspond to the identifier that allows to assign (or to determine)—within a subscriber session—a pair of messages acting as request and response. This identifier or common reference information may be able to be comprised of different identifier elements, for example, a user (or subscriber) identifier "UserID", possibly combined with a message identifier and/or an accounting session identifier. UserID==Subscriber session, comprises a plurality of MessageID==AAA protocol pairs of request/response messages and/or Accounting Session ID==Accounting sessions (e.g. Voice, IPTV, BEI), comprises a plurality of MessageID==AAA protocol pairs of request/response messages. All three types of pieces of identifier information are able to be nested and provide—in such a nested combination—the common reference information.

According to another embodiment of the present invention, a subscriber information (of a subscriber identifier) is able to be used as the common reference information, e.g. the identifier present in a Radius access request/response pair. Other alternatives of a common reference information include the Accounting Session ID, or other unique subscriber identifiers. For example, with reference to FIG. 3, the first AAA-related message 201, e.g., comprises (as a Radius Access-Accept message): "identifier=1001 (subscr-1001); Framed-IP-Address=1.2.3.4; . . . ;IGMP-Enable=1", whereas the second AAA-related message 301, e.g., comprises (as a Radius Access-Accept message): "identifier=1001 (subscr-1001); Framed-IP-Address=1.2.3.4; . . . " (i.e. without the vendor-specific attribute); in this example, the third AAA-related message 401 would, e.g., comprise: "REST API call: POST se/subscr-1001/igmp-enable/1".

According to still a further embodiment of the present invention, it is preferred that a per service accounting is possible for multi-service subscribers (i.e. subscribers having subscriptions regarding a plurality of different services). The standardized Radius protocol (as per RFC 2866) does provide dedicated messages and attributes for traffic volume accounting. Such accounting is intended for counters per subscriber session. Today, many operators not only need per subscriber granularity, but per service granularity, i.e. within a subscriber session. This may be implemented (in Broadband Network Gateway devices) using several vendor-specific attributes for activating services via tagged attributes (e.g. Activate-Service, Service-Statistics) where the tag index represents the service in the subscriber session. Then new per service accounting identifiers are generated based on the combination of the subscriber session accounting identifier and the tag index. Those service-specific accounting identifiers are able to be used in per service accounting messages (start, intermediate, stop).

According to the present invention, the service edge entity 111 (or at least its access protocol end point 350) does not support these functionalities such as per service accounting IDs, timer management for the various subscriber services or the generation of per service Radius accounting messages. Instead, and via the further access protocol end point 450, the service edge entity 111 provides an API to query the per service counters. Towards the authentication server entity 150 (or the policy and AAA server), the access orchestrator entity 115 provides such per service accounting messages via the access protocol used, such as the Radius protocol.

Hence, according to the present invention, the access orchestrator entity 115 implements the corresponding timers for the accounting intervals, queries the API on the service edge entity 111 (via the further access protocol end point 450) at the appropriate times to obtain the latest counters, and generates the per service Radius accounting messages to be sent towards the authentication server entity 150.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for an access network of a telecommunications network, wherein the telecommunications network comprises an authentication server entity providing an authentication, authorization and accounting (AAA) functionality and a policy server functionality, wherein the telecommunications network further comprises a plurality of service edge entities, each service edge entity providing a service enabling functionality to subscriber devices connected to the telecommunications network,
wherein—in order to enable or to provide communication services to the subscriber devices requesting such communication services—AAA-related messages are sent and received by both the authentication server entity and a service edge entity via an access orchestrator entity as part of the access network, the AAA-related messages conforming to or using an access protocol used between the authentication server entity and the service edge entity,
wherein the method comprises:
in a first step, a first AAA-related message is sent by the authentication server entity and received by the access orchestrator entity, the first AAA-related message comprising:
at least one standardized message attribute according to the access protocol;
and
at least one vendor-specific message attribute;
in a second step, subsequent to the first step, the access orchestrator entity sends a second AAA-related message to the service edge entity, the second AAA-related message solely comprising the at least one standardized message attribute according to the access protocol; and
in a third step, subsequent to the first step and prior to, during or after the second step, the access orchestrator entity sends at least one third AAA-related message to the service edge entity, the at least one third AAA-related message corresponding to a message according to an application programming interface (API) or to a further access protocol.

2. The method according to claim 1, wherein both the second AAA-related message and the at least one third AAA-related message either comprise or refer to a piece of common reference information, wherein via the common reference information, the second AAA-related message and the at least one third AAA-related message relate to or refer to each other.

3. The method according to claim 2, wherein the piece of common reference information corresponds to one or a plurality of the following:
an identifier of a subscriber or user of a requested communication service, a reference to the identifier of the subscriber or user, or a hash value of the identifier of the subscriber or user;
an identifier of an accounting session, a reference to the identifier of the accounting session, or a hash value of the identifier of the accounting session; or
an identifier of the second AAA-related message and the at least one third AAA-related message, a reference to the identifier of the second AAA-related message and the at least one third AAA-related message, or a hash value of the identifier of the second AAA-related message and the at least one third AAA-related message.

4. The method according to claim 1, wherein the second AAA-related message is received by an access protocol end point which is part of the service edge entity, and wherein the at least one third AAA-related message is received by a further access protocol end point which is part of the service edge entity.

5. The method according to claim 1, wherein via the at least one third AAA-related message, the at least one vendor-specific message attribute or its information content is transmitted to the service edge entity.

6. The method according to claim 1, wherein the access protocol corresponds to one of the following protocols:
a Remote Authentication Dial-In User Service (RADIUS) protocol; or
a DIAMETER authentication, authorization, and accounting protocol for computer networks.

7. The method according to claim 1, wherein the at least one third AAA-related message is a message according to one or a plurality of the following application programming interfaces or protocols:
Representational State Transfer (REST);
Simple Object Access Protocol (SOAP);
Web Services Description Language (WSDL);
Google Remote Procedure Calls (gRPC); or
Hypertext Transfer Protocol (HTTP).

8. The method according to claim 1, wherein a first kind of AAA-related messages are exchanged between the authentication server entity and the access orchestrator entity, and a second kind of AAA-related messages are exchanged between the access orchestrator entity and the service edge entity, wherein the first kind of AAA-related messages comprise:
one or a plurality of standardized message attributes; and
one or a plurality of vendor-specific message attributes.

9. The method according to claim 8, wherein—in addition to a number of the first kind of AAA-related messages and/or in addition to a number of the second kind of AAA-related messages—via the at least one third AAA-related message and/or via a third kind of AAA-related messages exchanged between the access orchestrator entity and the service edge entity, accounting on a per service granularity is realized, wherein the access orchestrator entity establishes and maintains an internal abstraction of a subscriber policy to be applied.

10. A telecommunications network, comprising:
an access network comprising an access orchestrator entity;
an authentication server entity providing an authentication, authorization and accounting functionality (AAA) and a policy server functionality; and
a plurality of service edge entities, each service edge entity providing a service enabling functionality to subscriber devices connected to the telecommunications network;
wherein both the authentication server entity and a service edge entity of the plurality of service edge entities are configured to send and receive AAA-related messages to enable or to provide communication services to the subscriber devices requesting such communication services, the AAA-related messages conforming to or using an access protocol used between the authentication server entity and the service edge entity;
wherein the authentication server entity is configured to send a first AAA-related message to the access orchestrator entity, the first AAA-related message comprising:
at least one standardized message attribute according to the access protocol;
and
at least one vendor-specific message attribute;
wherein the access orchestrator entity is configured to send a second AAA-related message to the service edge entity, the second AAA-related message solely comprising the at least one standardized message attribute according to the access protocol; and
wherein the access orchestrator entity is configured to send at least one third AAA-related message to the service edge entity, the at least one third AAA-related message corresponding to a message according to an application programming interface (API) or to a further access protocol.

11. A non-transitory computer-readable medium having processor-executable instructions stored thereon for an access orchestrator entity which is part of an access network of a telecommunications network, the telecommunications network comprising an authentication server entity providing an authentication, authorization and accounting functionality (AAA) and a policy server functionality, and the telecommunications network furthermore comprising a plurality of service edge entities, each service edge entity providing a service enabling functionality to subscriber devices connected to the telecommunications network, wherein—in order to enable or to provide communication services to the subscriber devices requesting such communication services—AAA-related messages are sent and received by both the authentication server entity and the service edge entity via the access orchestrator entity, the AAA-related messages conforming to or using an access protocol used between the authentication server entity and the service edge entity, wherein the processor-executable instructions, when executed, facilitate:

receiving, by the access orchestrator entity, a first AAA-related message from the authentication server entity, the first AAA-related message comprising:
at least one standardized message attribute according to the access protocol;
and
at least one vendor-specific message attribute;

sending, by the access orchestrator entity, a second AAA-related message to the service edge entity, the second AAA-related message solely comprising the at least one standardized message attribute according to the access protocol; and sending, by the access orchestrator entity, at least one third AAA-related message to the service edge entity, the at least one third AAA-related message corresponding to a message according to an application programming interface (API) or to a further access protocol.

* * * * *